United States Patent
Chu

(10) Patent No.: US 10,662,837 B2
(45) Date of Patent: May 26, 2020

(54) BLOW-BY GAS PURGE APPARATUS FOR ENGINE

(71) Applicants: HYUNDAI MOTOR COMPANY, Seoul (KR); KIA MOTORS CORPORATION, Seoul (KR)

(72) Inventor: Dong Ho Chu, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/397,106

(22) Filed: Apr. 29, 2019

(65) Prior Publication Data
US 2020/0116055 A1 Apr. 16, 2020

(30) Foreign Application Priority Data
Oct. 10, 2018 (KR) .......................... 10-2018-0120566

(51) Int. Cl.
*F01M 13/02* (2006.01)
*F01M 13/00* (2006.01)

(52) U.S. Cl.
CPC ... *F01M 13/028* (2013.01); *F01M 2013/0044* (2013.01)

(58) Field of Classification Search
CPC .................. F01M 13/028; F01M 2013/0044
See application file for complete search history.

(56) References Cited

U.S. PATENT DOCUMENTS

| 4,602,607 A * | 7/1986 | Balsley ................ F01M 13/023 123/41.86 |
| 2003/0010321 A1* | 1/2003 | Rentschler ........... F01M 13/022 123/472 |
| 2006/0191505 A1* | 8/2006 | Doko ................ F02M 35/10039 123/184.59 |
| 2011/0203559 A1* | 8/2011 | Tanikawa ............. F01M 13/023 123/572 |

FOREIGN PATENT DOCUMENTS

KR    10-2011-0062184 A    6/2011

* cited by examiner

*Primary Examiner* — Kevin A Lathers
(74) *Attorney, Agent, or Firm* — Morgan, Lewis & Bockius LLP

(57) ABSTRACT

A blow-by gas purge apparatus includes: a positive crankcase ventilation (PCV) valve disposed on a cylinder head; a head passage penetrating on the cylinder head to communicate with a discharge side of the PCV valve; and a port adaptor interposed between the cylinder head and an intake manifold. The port adaptor includes: multiple intake communication holes such that each intake runner of the intake manifold communicates with each intake port of the cylinder head; an inlet hole communicating with the head passage; and a distribution passage dividing and supplying blow-by gases introduced through the inlet hole into the multiple intake communication holes.

7 Claims, 4 Drawing Sheets

BLOW-BY GAS PURGE APPARATUS FOR ENGINE

CROSS REFERENCE TO RELATED APPLICATION

The present application claims priority to Korean Patent Application No. 10-2018-0120566, filed Oct. 10, 2018, the entire contents of which is incorporated herein for all purposes by this reference.

TECHNICAL FIELD

The present disclosure relates to a blow-by gas purge apparatus for purging blow-by gases generated in a crankcase of an engine.

BACKGROUND

Blow-by gases in a conventional engine are transferred to an engine intake manifold through a positive crankcase ventilation (PCV) valve, and are eventually combusted in a combustion chamber.

For this, a head cover and the engine intake manifold are connected to each other by a PCV hose such that the blow-by gases are transferred to the engine intake manifold through the PCV hose.

When operating a vehicle in a low temperature environment, the PCV hose exposed to the outside of the engine is cooled, leading to freezing of the moisture contained in the blow-by gases inside the PCV hose. If such a phenomenon occurs excessively, an icing problem where the PCV hose is clogged by freezing may occur.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and an objective of the present disclosure is to propose a blow-by gas purge apparatus for an engine, the apparatus having a simple structure and preventing icing of a blow-by gas flow passage even when a vehicle operates in a low temperature, thereby enabling smooth purging of the blow-by gases at all times.

In order to achieve the above objective, according to one exemplary embodiment of the present disclosure, a blow-by gas purge apparatus for an engine includes: a positive crankcase ventilation (PCV) valve disposed on a cylinder head; a head passage penetrating on the cylinder head to communicate with a discharge side of the PCV valve; and a port adaptor interposed between the cylinder head and an intake manifold, and including: multiple intake communication holes such that each intake runner of the intake manifold communicates with each intake port of the cylinder head; an inlet hole communicating with the head passage; and a distribution passage dividing and supplying blow-by gases introduced through the inlet hole into the multiple intake communication holes.

The PCV valve may be integrally connected with the head cover.

The head passage may be configured such that the multiple intake ports communicate with the intake manifold through an inside wall of the cylinder head such that surfaces thereof are connected to each other.

The port adaptor may be a flat plate, which is interposed between the intake manifold and the cylinder head and provided with the multiple intake communication holes formed therein. The inlet hole may be formed to be open between two adjacent intake communication holes. The distribution passage may include: a first distribution passage communicating two intake communication holes adjacent to the inlet hole with the inlet hole; and a second distribution passage communicating the inlet hole with remaining intake communication holes other than the two intake communication holes with which the first distribution passage communicates.

At least one among the first distribution passage and the second distribution passage may be formed into a groove exposed on a surface of the port adaptor facing the cylinder head.

The port adaptor may be a flat plate, which is interposed between the intake manifold and the cylinder head and provided with the multiple intake communication holes formed therein in a manner being linearly arranged. The inlet hole may be formed at an approximately center position of a straight line that the multiple intake communication holes are arranged in. The distribution passage may have a configuration in which distances from the inlet hole to the respective intake communication holes are the same.

According to another exemplary embodiment of the present disclosure, a port adaptor interposed between a cylinder head and an intake manifold includes: multiple intake communication holes through which each intake runner of the intake manifold communicates with each intake port of the cylinder head; an inlet hole on a surface facing the cylinder head to receive blow-by gases; and a distribution passage dividing and supplying the blow-by gases introduced through the inlet hole into the multiple intake communication holes.

According to the present disclosure, the apparatus has a simple structure and prevents icing of a blow-by gas flow passage even when a vehicle operates in a low temperature, thereby enabling smooth purging of the blow-by gases at all times.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
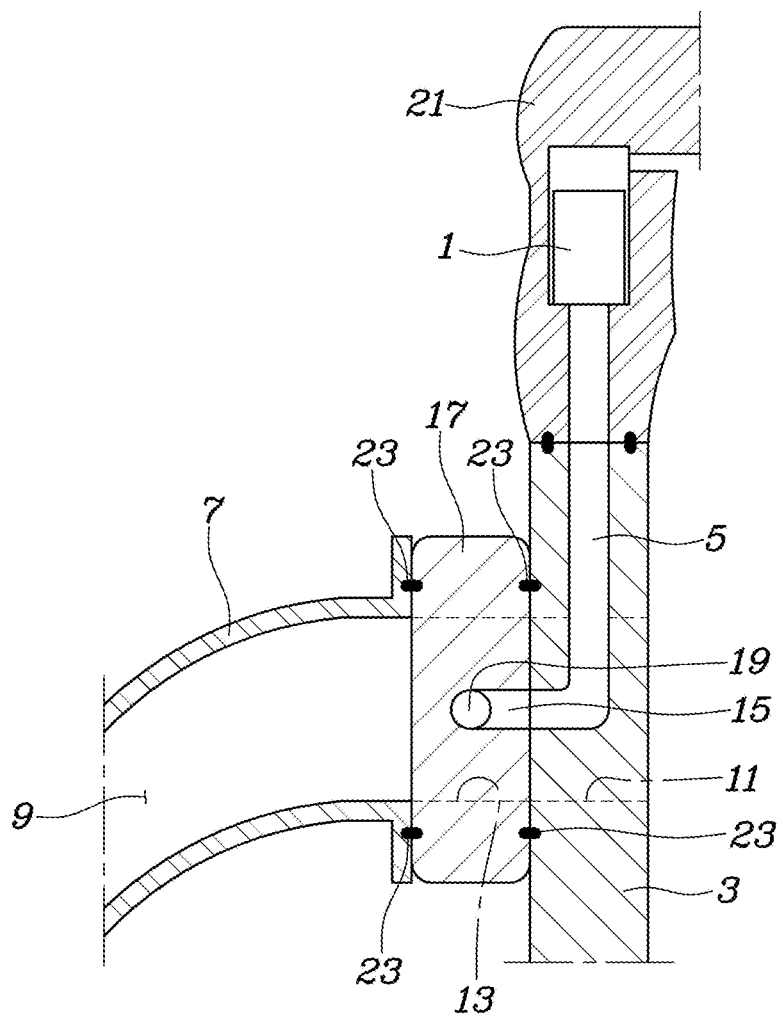
FIG. 1 is a cross-sectional view illustrating a blow-by gas purge apparatus for an engine according to the present disclosure.
Figure 2:
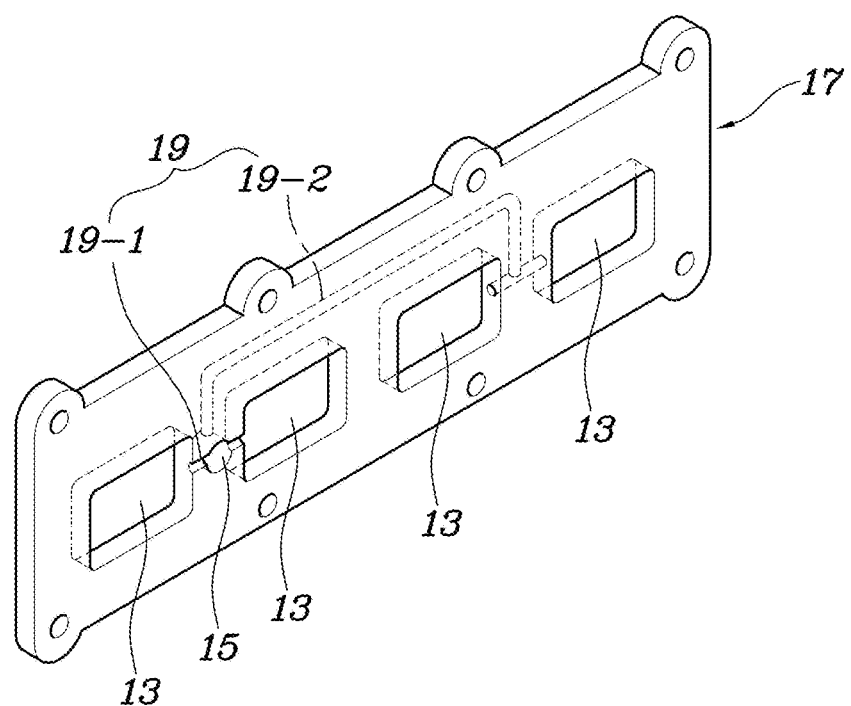
FIG. 2 is a diagram illustrating a port adaptor according to an embodiment of the present disclosure.
Figure 3:
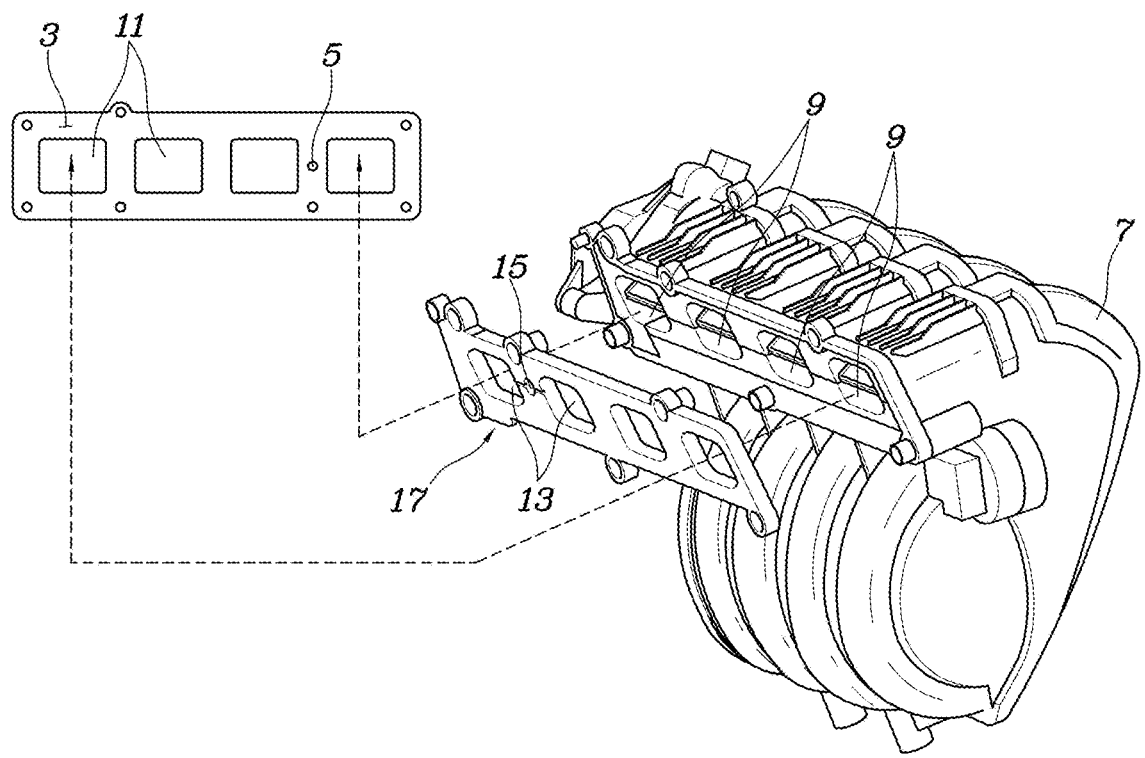
FIG. 3 is a diagram illustrating the port adapter and an intake manifold according to the present disclosure.

Referring to FIGS. 1 to 3, a blow-by gas purge apparatus for an engine of the present disclosure includes: a positive crankcase ventilation (PCV) valve 1 disposed on a cylinder head 3; a head passage 5 formed in the cylinder head 3 to communicate with a discharge side of the PCV valve 1; a port adaptor 17 interposed between the cylinder head 3 and an intake manifold 7, provided with multiple intake communication holes 13 such that each intake runner 9 of the intake manifold 7 communicates with each intake port 11 of the cylinder head 3, and provided with an inlet hole 15 communicating with the head passage 5; and a distribution passage 19 formed in the port adaptor 17 to divide and supply blow-by gases introduced through the inlet hole 15 into the multiple intake communication holes 13.

That is, the present disclosure is characterized in that the blow-by gases passing through the PCV valve 1 are supplied to the intake ports 11 of the engine through the head passage 5, the inlet hole 15, and the distribution passage 19, and then are supplied to a combustion chamber with sucked air to be burned. As described above, as the blow-by gases passing through the PCV valve 1 are joined with the intake air through the internal structure of the engine without passing through a passage exposed to the outside of the engine, this prevents the icing of the blow-by gases even under extremely low temperature driving conditions.

The PCV valve 1 is provided on the cylinder head side, that is, on the cylinder head 3, on the head cover 21, on a space between the head cover 21 and the cylinder head 3, or the like such that the blow-by gases delivered from a crankcase of the engine can be controlled to be sent to an intake system of the engine.

In the present embodiment, the PCV valve 1 has a structure integrally formed with the head cover 21. That is, the head cover 21 is configured to serve as a valve body of the PCV valve 1 such that how much the space between the head cover 21 and the cylinder head 3 is communicated with the head passage 5 as the valve spool moves within the head cover 21.

The head passage 5 is configured such that the multiple intake ports 11 communicate with the intake manifold 7 through an inside wall of the cylinder head 3 whereby surfaces thereof are connected to each other.

That is, the head passage 5 allows the blow-by gases to move toward the intake system of the engine through the inside wall of the cylinder head 3 constituting the engine, without being exposed to the outside of the engine.

The port adaptor 17 is a flat plate, which is interposed between the intake manifold 7 and the cylinder head 3 and provided with the multiple intake communication holes 13 formed therein.

Conventionally, a flange portion of an intake manifold comes into contact with a side surface of the cylinder head to be engaged therewith. However, in the present disclosure, the intake manifold 7 and the cylinder head 3 are engaged with each other with the port adaptor 17 being interposed therebetween.

The port adaptor 17 is provided with a seal 23 on surfaces thereof facing the cylinder head 3 and facing the intake manifold 7. Accordingly, when mounting the intake manifold 7 to the cylinder head 3 via the port adaptor 17, the intake passage communicating from the intake manifold 7 to the cylinder head 3 may be sealed without using an additional gasket.

An indication of the seal 23 described above is omitted from the port adaptor 17 of FIGS. 2 and 4 in order to more clearly illustrate the inlet hole 15 and the distribution passage 19, which are main constituents of the present disclosure.

In the embodiment illustrated in FIG. 2, the inlet hole 15 is formed to be open between two adjacent intake communication holes 13. In addition, the distribution passage 19 includes: a first distribution passage 19-1 communicating two intake communication holes 13 adjacent to the inlet hole 15 with the inlet hole 15; and a second distribution passage 19-2 communicating the inlet hole 15 with remaining intake communication holes 13 other than the two intake communication holes 13 with which the first distribution passage 19-1 communicates.

Here, at least one among the first distribution passage 19-1 and the second distribution passage 19-2 maybe formed into a groove exposed on a surface of the port adaptor 17 facing the cylinder head 3. FIG. 2 illustrates that the first distribution passage 19-1 is formed into a groove.

This configuration is advantageous in that a process of forming the distribution passage 19 of the port adaptor 17 is simplified whereby the port adaptor 17 can be manufactured with a low cost.

Figure 4:
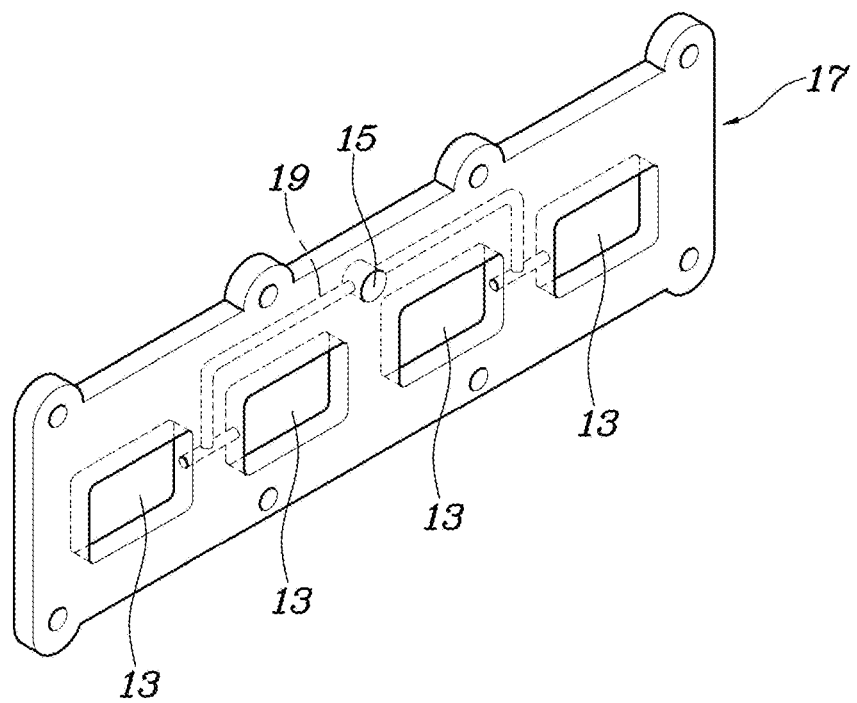
FIG. 4 is a diagram illustrating a port adaptor according to another embodiment of the present disclosure.

FIG. 4 is a diagram illustrating a port adaptor 17 according to another embodiment of the present disclosure. The port adaptor 17 is a flat plate, which is interposed between the intake manifold 7 and the cylinder head 3 and provided with the multiple intake communication holes 13 formed therein in a manner being linearly arranged. The inlet hole 15 is formed at an approximately center position of a straight line that the multiple intake communication holes 13 are arranged in. The distribution passage 19 has a configuration in which distances from the inlet hole 15 to the respective intake communication holes 13 are the same.

This configuration is advantageous in that the distances of the distribution passage 19 from the inlet hole 15 to the respective intake communication passages are the same whereby the amount of blow-by gases delivered per each intake port is approximately the same.

As described above, according to the present disclosure, it is possible to prevent icing of the blow-by gas, which is caused when the blow-by gases sent to the intake system of the engine through the PCV valve 1 passes through the passage exposed to the outside of the engine. Accordingly, the blow-by gases are supplied uniformly and stably to each combustion chamber of the engine through the head passage 5 of the cylinder head 3, and the inlet hole 15 and the distribution passage 19 of the port adaptor 17.

Although the exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A blow-by gas purge apparatus for an engine, the apparatus comprising:
   a positive crankcase ventilation (PCV) valve disposed on a cylinder head;
   a head passage penetrating on the cylinder head to communicate with a discharge side of the PCV valve; and
   a port adaptor interposed between the cylinder head and an intake manifold, wherein the port adaptor includes:
      multiple intake communication holes such that each intake runner of the intake manifold communicates with each intake port of the cylinder head;
      an inlet hole communicating with the head passage; and
      a distribution passage dividing and supplying blow-by gases introduced through the inlet hole into the multiple intake communication holes.

2. The apparatus of claim 1, wherein the PCV valve is integrally connected with the head cover.

3. The apparatus of claim 1, wherein the multiple intake ports communicate with the intake manifold through an inside of the cylinder head while a surface of the cylinder head and a surface of the intake manifold are connected to each other.

4. The apparatus of claim 1, wherein the port adaptor is a flat plate, which is interposed between the intake manifold and the cylinder head and includes the multiple intake communication holes,
- wherein the inlet hole is open between two adjacent intake communication holes, and
- wherein the distribution passage includes:
  - a first distribution passage through which two intake communication holes adjacent to the inlet hole communicate with the inlet hole; and
  - a second distribution passage through which the inlet hole communicates with remaining intake communication holes other than the two intake communication holes with which the first distribution passage communicates.

5. The apparatus of claim 4, wherein at least one among the first distribution passage and the second distribution passage has a groove exposed on a surface of the port adaptor facing the cylinder head.

6. The apparatus of claim 1, wherein the port adaptor is a flat plate, which is interposed between the intake manifold and the cylinder head and has the multiple intake communication holes linearly arranged,
- wherein the inlet hole is located at a center of a straight line on which the multiple intake communication holes are linearly arranged, and
- wherein travel distances of the blow-by gases through the distribution passage from the inlet hole to the respective intake communication holes are the same.

7. A port adaptor interposed between a cylinder head and an intake manifold, the port adaptor comprising:
- multiple intake communication holes through which each intake runner of the intake manifold communicates with each intake port of the cylinder head;
- an inlet hole on a surface facing the cylinder head to receive blow-by gases; and
- a distribution passage dividing and supplying the blow-by gases introduced through the inlet hole into the multiple intake communication holes.

\* \* \* \* \*